United States Patent

Aymeric et al.

(10) Patent No.: US 10,332,404 B2
(45) Date of Patent: Jun. 25, 2019

(54) METHOD FOR COMPUTING THE REPRESENTATION OF THE TRAJECTORY OF AN AIRCRAFT IN FLIGHT

(71) Applicant: THALES, Courbevoie (FR)

(72) Inventors: Bruno Aymeric, St Medard (FR); Xavier Servantie, Pessac (FR); Matthieu Claybrough, Ramonville (FR)

(73) Assignee: THALES, Courbevoie (FR)

( * ) Notice: Subject to any disclaimer, the term of this patent is extended or adjusted under 35 U.S.C. 154(b) by 264 days.

(21) Appl. No.: 15/357,702

(22) Filed: Nov. 21, 2016

(65) Prior Publication Data

US 2017/0154534 A1 Jun. 1, 2017

(30) Foreign Application Priority Data

Nov. 27, 2015 (FR) ...................................... 15 02485

(51) Int. Cl.
| | | |
|---|---|---|
| *G01C 23/00* | (2006.01) | |
| *G05D 1/00* | (2006.01) | |
| *G05D 3/00* | (2006.01) | |
| *G06F 7/00* | (2006.01) | |
| *G06F 17/00* | (2019.01) | |
| *G08G 5/00* | (2006.01) | |
| *B64D 43/00* | (2006.01) | |

(52) U.S. Cl.
CPC ............ *G08G 5/0021* (2013.01); *B64D 43/00* (2013.01); *G01C 23/005* (2013.01); *G08G 5/0052* (2013.01)

(58) Field of Classification Search
None
See application file for complete search history.

(56) References Cited

U.S. PATENT DOCUMENTS

| | | | | |
|---|---|---|---|---|
| 8,532,849 | B1 * | 9/2013 | Tsai ...................... | G01C 23/00 340/979 |
| 2015/0323933 | A1 * | 11/2015 | Darbois ............... | G05D 1/0202 701/4 |

FOREIGN PATENT DOCUMENTS

| | | | | |
|---|---|---|---|---|
| EP | 2 568 256 A2 | 3/2013 | | |
| EP | 2568256 A2 * | 3/2013 | ........... | G01C 23/005 |

* cited by examiner

*Primary Examiner* — Abby Y Lin
*Assistant Examiner* — Kenny A. Taveras
(74) *Attorney, Agent, or Firm* — Baker & Hostetler LLP

(57) ABSTRACT

A method for the three-dimensional representation of the trajectory of an aircraft in flight implemented in a navigation system of an aircraft is provided. The flight plan of the aircraft comprises imposed georeferenced trajectories and predicted non-georeferenced trajectories. When the trajectory of the aircraft is dependent on a non-georeferenced flight setpoint, the three-dimensional representation method is an iterative process comprising the following steps: computing a predicted trajectory arising from at least one computed trajectory extending over a determined distance or duration; computing a smoothed trajectory from the predicted trajectory in order to obtain a resulting trajectory; computing a displayed trajectory, the trajectory being equal to the resulting trajectory corrected for constant deviations or deviations depending on the application of setpoints from the flight director; and displaying the displayed trajectory.

8 Claims, 4 Drawing Sheets

METHOD FOR COMPUTING THE REPRESENTATION OF THE TRAJECTORY OF AN AIRCRAFT IN FLIGHT

CROSS-REFERENCE TO RELATED APPLICATIONS

This application claims priority to foreign French patent application No. FR 1502485, filed on Nov. 27, 2015, the disclosure of which is incorporated by reference in its entirety.

FIELD OF THE INVENTION

The field of the invention is that of graphically representing the three-dimensional trajectory of an aircraft in flight in a synthetic vision system, or SVS.

BACKGROUND

In modern aircraft, the primary flight display screens now include a three-dimensional synthetic representation of the outside world. These representations may comprise an indicator of the flight plan followed by the aircraft. Older representations are of the "highway in the sky" type. FIG. 1 shows one of these representations. The trajectory of the aircraft A is symbolically represented by a central path 1. This path 1 is framed by a succession of rectangles 2 representing the limits of the "tunnel" representing the three-dimensional trajectory 1. The track on the ground of the trajectory is represented by the shadow 3.

These representations work well for trajectories perfectly defined within a terrestrial frame of reference. They are referred to as being "georeferenced". Unfortunately, it is not possible to perfectly georeference the entirety of the trajectory of an aircraft. When the trajectory is not perfectly defined within a terrestrial frame of reference, the portions of the tunnel of the trajectory which are not defined within a terrestrial frame of reference then produce discontinuities, as shown in FIG. 1.

Specifically, in a flight plan, the trajectory may be defined in various ways. As stated above, the simplest way is the planned and georeferenced trajectory, generally computed by the flight management system.

However, in certain phases of the flight, pilots implement flight modes that distance the aeroplane from this planned trajectory.

By way of first example, air traffic control may request that the crew keep to a particular heading or descend to a specific altitude. In this case, the representation of the trajectory is no longer clear. FIG. 2 shows a view from above of a situation in which the aeroplane is guided in heading mode. Aircraft A must be guided towards heading C. The trajectory T effectively being followed is a prediction which includes a portion of rallying towards the target heading, then keeping to the heading. This prediction requires wind to be taken into account, since the heading represents the direction of the nose of the aeroplane, rather than the direction of the path. It may therefore turn out to be imprecise. The hashed portion represents the variation T' in the trajectory depending on the wind strength.

By way of second example, FIG. 3, which represents a view from above the overflown terrain, shows the difference in trajectory depending on whether a navigation mode is armed. In "armed" mode, when the aeroplane is close to the planned trajectory $T_P$, this trajectory becomes the reference for guidance. The overall prediction for the trajectory T of the aircraft therefore includes a first, predicted portion T1 and a second portion T2 defined within a georeferenced frame of reference and which neighbours the planned trajectory $T_P$. If the navigation mode is not armed, the aircraft continues to follow its initial heading and its trajectory T includes a second portion T'2 differing from the portion T2.

By way of third example, certain portions of the flight may be undertaken in a mode referred to as "performance" mode, in which engine speed is fixed, and the resulting ground slope may vary depending on the wind.

The above concepts explained in relation to lateral trajectory are also valid for vertical trajectory. For example, the aircraft may be guided in "vertical speed" mode, i.e. a mode in which the vertical speed of the aircraft is kept at a precise value. Here again, the prediction is affected by taking the wind into account. As a general rule, a vertical mode is engaged at a setpoint altitude that ends the descent or ascent. The predicted trajectory of the aircraft is then stabilized at this altitude.

Thus, when the trajectory is not perfectly defined within a terrestrial frame of reference, the portions of the tunnel of the trajectory which are not defined within this terrestrial frame of reference produce discontinuities, as shown in FIG. 1.

SUMMARY OF THE INVENTION

The method according to the invention does not have these drawbacks. It allows the entirety of the future trajectory of an aircraft to be displayed in a three-dimensional representation. This displayed trajectory is a succession of segments, each segment corresponding either to a predicted trajectory portion, or to a trajectory referred to as an imposed trajectory. In the first case, the segment is determined from a non-georeferenced flight setpoint. In the second case, the segment is determined from a georeferenced flight setpoint. Moreover, the method according to the invention manages deviations in the trajectory and the transition from "predicted" segments to "imposed" segments. More specifically, the subject of the invention is a method for the three-dimensional synthetic representation of the trajectory of an aircraft in flight, said method being implemented in a flight and navigation system of an aircraft, said flight and navigation system comprising at least one navigation system, one cartographic database representing the overflown terrain, a three-dimensional image computer and a display system allowing computed synthetic images to be displayed, the flight plan of the aircraft comprising georeferenced trajectories, referred to as imposed trajectories, and non-georeferenced trajectories, referred to as predicted trajectories, characterized in that, when the trajectory of the aircraft is dependent on a non-georeferenced flight setpoint, said three-dimensional synthetic representation method is an iterative process, each iteration comprising at least the following steps:

computing a predicted trajectory arising from at least one trajectory computed extending over a determined distance or duration;
  computing a smoothed trajectory from the predicted trajectory in order to obtain a resulting trajectory;
  computing a displayed trajectory, said trajectory being equal to the resulting trajectory corrected for constant deviations or deviations depending on the application of setpoints from the flight director;
  displaying said displayed trajectory.

Advantageously, the predicted trajectory is a function of three successive trajectories of the aircraft, referred to as computed trajectories, computed at at least three successive instants in time separated by a constant duration, each of the three trajectories starting at one of said three instants in time, each trajectory extending over a determined distance or duration.

Advantageously, the predicted trajectory is a quadratic interpolation of the computed trajectories.

Advantageously, when the trajectory of the aircraft depends on a non-georeferenced flight setpoint at the current time and depends on a georeferenced flight setpoint at a future time, the duration separating the future time from the current time corresponding to a distance travelled by the aircraft that is less than or equal to a determined threshold, the resulting trajectory is dependent on the computed trajectories and on the conditions for engaging said georeferenced flight setpoint.

Advantageously, when there is a computed deviation between the resulting trajectory and the displayed trajectory, the deviation displayed at the current time is either the sum of the deviation displayed at a preceding time corrected for a function dependent on the tracking performance of the flight director, or the product of the deviation displayed at the preceding time with a determined coefficient, intended to decrease this deviation.

Advantageously, the displayed trajectory takes the form of a path of determined width, positioned laterally depending on the computed deviations and above the resulting trajectory by a determined height, said path being limited by boundary markers spaced a determined distance apart.

Advantageously, the shape, colour or size of the boundary markers differs according to whether the trajectory is imposed or predicted in a lateral plane.

Advantageously, the shape, colour or size of the boundary markers differs according to whether the trajectory is imposed or predicted in a vertical plane.

BRIEF DESCRIPTION OF THE DRAWINGS

The invention will be better understood and other advantages will become apparent on reading the following description, which is given by way of non-limiting example, and from the appended figures in which.

DETAILED DESCRIPTION

Figure 1:
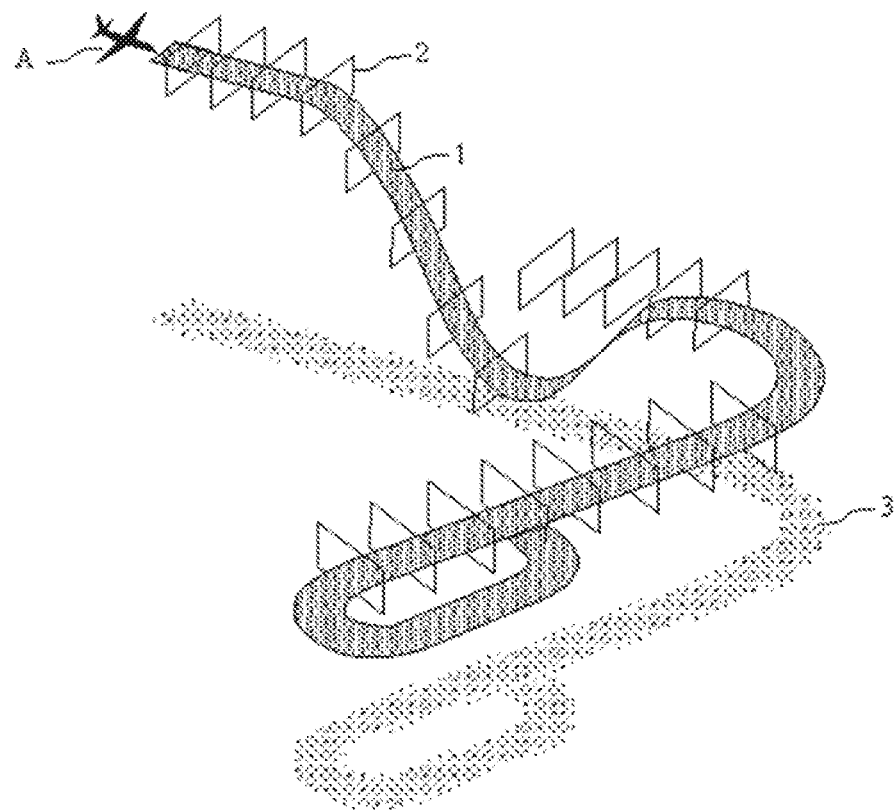
FIG. 1 shows a perspective view of a trajectory according to the prior art.
Figure 2:
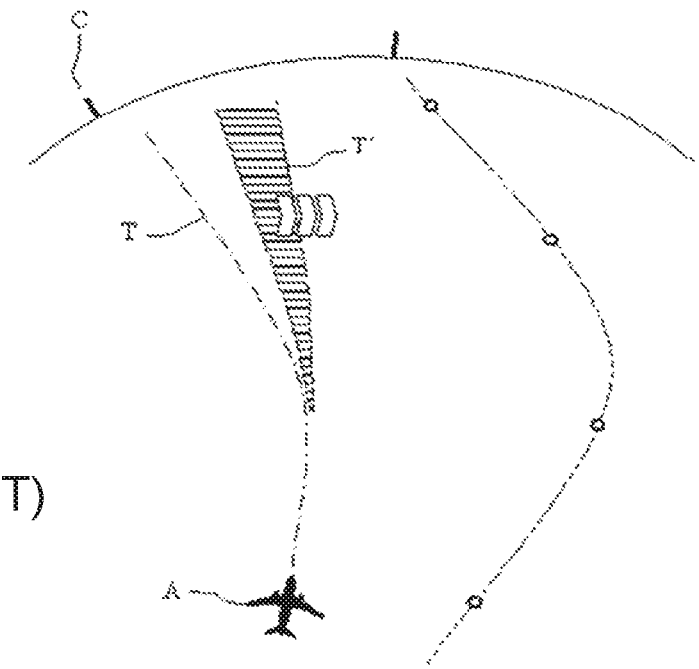
FIG. 2 shows a view from above of an aircraft trajectory in heading mode according to the prior art.
Figure 3:
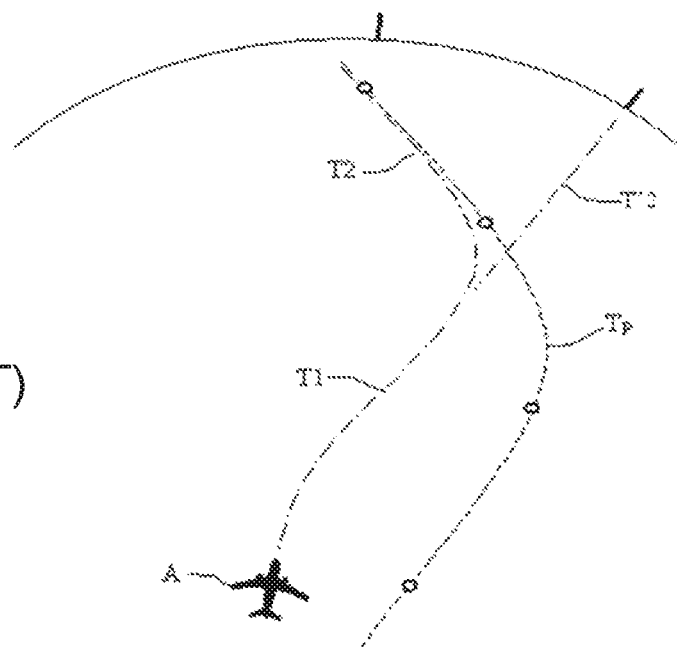
FIG. 3 shows a view from above of an aircraft trajectory in "armed" mode according to the prior art.

The method for the three-dimensional synthetic representation of the trajectory of an aircraft in flight according to the invention is implemented in a flight and navigation system of an aircraft.

This flight and navigation system comprises at least one navigation system, one cartographic database representing the overflown terrain, a three-dimensional image computer and a display system allowing computed synthetic images to be displayed.

An aeronautical trajectory of an aircraft comprises a lateral component located in a horizontal plane and a vertical component located in a vertical plane. The flight plan of the aircraft comprises georeferenced trajectory portions, referred to as imposed portions, and non-georeferenced trajectory portions, referred to as predicted portions. Of course, each lateral or vertical component of the trajectory may be imposed or predicted, i.e. four possible scenarios.

Non-georeferenced trajectories are sometimes followed even though the guidance mode normally corresponds to a georeferenced trajectory, for example of "navigation" type. For example, certain segments of the departure procedure require the aeroplane to follow a heading, even if the autopilot lateral mode is "navigation". Likewise, georeferenced trajectories are followed even though the guidance mode is not of "navigation" type.

The method according to the invention distinguishes between georeferenced trajectories and non-georeferenced trajectories, regardless of the subjacent modes of the autopilot.

When the trajectory is dependent on an imposed setpoint, it is understood that the graphical representation thereof does not pose any particular problems. The trajectory is displayed exactly where it should be, in the same way as the surrounding terrain.

When the trajectory of the aircraft is dependent on a non-georeferenced flight setpoint, the trajectory is no longer imposed and must be calculated from, for example, the flight setpoints defining the trajectory, for example a setpoint heading, from the wind and from the current speed of the aeroplane. This computation therefore leads to a prediction of an ideal trajectory. This ideal trajectory never corresponds exactly to the trajectory actually followed and must be computed periodically. Thus, in each computing cycle, a new trajectory must be computed. The origin of a trajectory computation is, by its nature, the current position of the aeroplane. However, the permanent representation of a trajectory originating from the aeroplane is not necessarily desirable, in particular in the case in which the pilot does not carry out the commands required to follow the flight setpoint.

The method for the three-dimensional synthetic representation of a predicted trajectory according to the invention is thus an iterative process, each iteration comprising four steps which are explained in detail below.

In a first step, the computer computes a predicted trajectory. The origin of this trajectory is the aeroplane and it corresponds to the trajectory that would actually be followed if the commands were perfectly applied and if all of the parameters were perfectly taken into account. For example, it is difficult to have perfect knowledge of the strength and direction of the wind. This computation is carried out, for example, using the following method.

In a first instance, the computer computes, at at least three successive instants in time T0, T1 and T2 separated by a constant duration, three successive trajectories $T_{T0}$, $T_{T1}$ and $T_{T2}$ of the aircraft, referred to as computed trajectories, each of the three trajectories starting at one of said three instants in time, each trajectory extending over a determined distance or duration. By way of example, the average duration separating two successive times is of the order of a second. The trajectory is computed over a distance corresponding to a few nautical miles. It is not necessary, at each time T0, for the computer to compute three new trajectories. Specifically, if, at the preceding time T−1, the computer computed three trajectories $T_{T-1}$, $T_{T0}$ and $T_{T1}$ corresponding to times T−1, T0 and T1, it may then compute only a single new trajectory $T_{T2}$ corresponding to time T2 and retain the old trajectories $T_{T0}$ and $T_{T1}$ corresponding to the successive times T0 and T1. In this way computing time is easily saved.

In a second instance, the computer determines a predicted trajectory $TR_T$, at a determined frequency, for a current time T located between the first time T0 and the second time T1, said predicted trajectory being dependent on said computed trajectories. $R_T$ denotes the ratio equal to (T−T0)/(T1−T0). It is between 0 and 1. The determined frequency is linked to the refresh rate of the display system. It is typically about 15 hertz.

Various methods exist for computing this predicted trajectory $TR_T$. For example, each point in the trajectory is interpolated from the one or more corresponding points in the successive trajectories $T_{T0}$, $T_{T1}$ and $T_{T2}$ using a quadratic interpolation on the basis of the coefficient $R_T$. The formula used is known to those skilled in the art. Optionally, the interpolation for the position of the trajectory in the horizontal plane is entirely decoupled from the interpolation for the vertical position in order to guarantee an absolute separation of the axes. Of course, methods other than quadratic interpolation may be employed for this computation.

In a second step, the computer will potentially smooth the predicted trajectory in order to make it rectilinear for the purpose of obtaining a resulting trajectory. A heading setpoint is taken as an example. When this setpoint becomes active, the aeroplane starts by entering a turn, which ends when the heading is equal to the setpoint heading. Strictly speaking, the heading is never exactly the same as the setpoint heading. The resulting trajectory is therefore always a micro-turn along a rectilinear segment. This step consists of making the resulting trajectory rectilinear when the flight setpoint is almost exactly followed. For example, when the aeroplane heading is very nearly equal to the setpoint heading.

In a third step, the computer computes the displayed trajectory TPT at time T, said trajectory being equal to the resulting trajectory corrected for a deviation dependent on the past and current application of setpoints from the flight director and for a deviation in position. Specifically, the origin of the predicted trajectory could be the current position of the aircraft. However, the presentation of this perfect trajectory would give the pilot the impression that his or her aircraft is always correctly centred on the right trajectory even if the pilot does not follow the setpoints. For example, if the current trajectory segment must be followed on a precise heading and the pilot does not undertake the action of reorienting towards this heading, the presentation must indicate to the pilot that something has not been done correctly. It is therefore necessary for the displayed trajectory to deviate from the position of the aircraft. This deviation must follow a fluid progression depending on the actions of the pilot.

In this case, the displayed trajectory is offset from the predicted trajectory by a displayed deviation $EA_T$ at time T. This deviation is computed in the following manner:

At time Ti−1, a resulting trajectory has been computed. $E_{Ti}$ then denotes the deviation between the actual position of the aircraft at time Ti and the predicted position at time Ti computed at time Ti−1. Moreover, at time Ti−1, a displayed deviation $EA_{Ti-1}$, which corresponds to the deviation between the actual position of the aircraft and the displayed trajectory, is computed. In the first cycle in which the algorithm is applied, this deviation is zero.

At time Ti, the displayed deviation $EA_{Ti}$ is computed in the following manner:

if the pilot has not followed the flight director, according to a criterion consisting, for example, of having to integrate the orders from the flight director in order to obtain a value Idv, $EA_{Ti}=EA_{Ti-1}+f(E_{Ti}, Idv)$, this deviation being limited to a maximum deviation value;

otherwise, the value of the deviation is $EA_{Ti}=k*EA_{Ti-1}*g$, k being a coefficient smaller than 1, g being a function of the deviation between the value of the control parameter and its setpoint. For example, g is a function of the deviation between the current heading and the heading setpoint if the segment is a heading setpoint segment. This means that if the pilot follows the flight director, the deviation will gradually be decreased. In the same way, if the controlled parameter returns to the setpoint value, the deviation gradually decreases.

Figure 4:
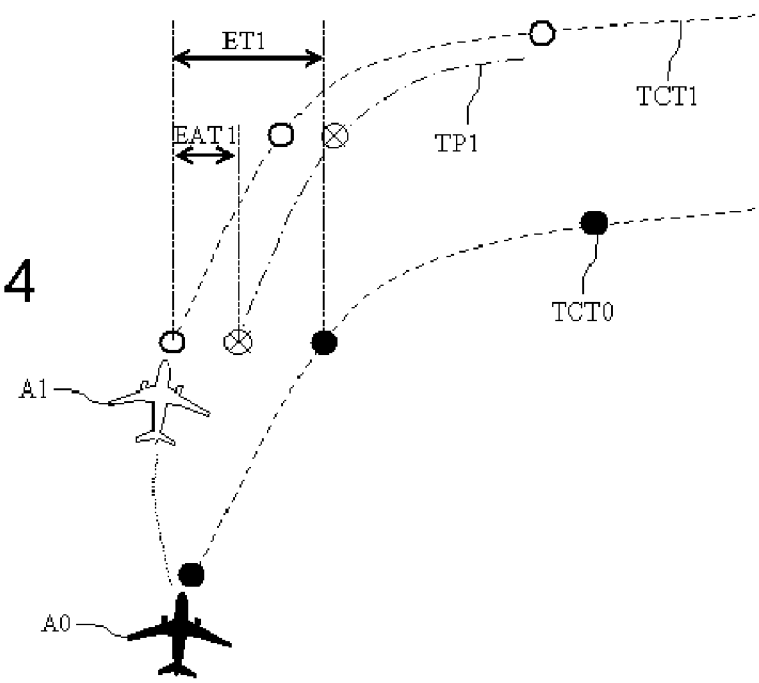
FIG. 4 shows a view from above of the variation over time of the computed and displayed trajectories according to the invention.

FIG. 4 schematically shows the various trajectories computed using the method according to the invention. In this figure, the aircraft A0 shown in black represents the true position of the aircraft at a time T0. The dotted curve arising from this aircraft A0 represents the computed trajectory TCT0 at time T0, the markers in the form of black circles representing the position of the trajectory at various successive times.

The white aircraft A1 represents the true position of the aircraft at a time T1. The dotted curve arising from this aircraft A1 represents the computed trajectory TCT1 at time T1, the markers in the form of white circles representing the position of the trajectory at various successive times. At time T1, the actual position of the aircraft has moved away from the computed trajectory TCT0 by a deviation ET1. As stated above, this deviation is not reflected in its entirety on the display, but rather only a portion EAT1 is actually displayed, as seen in FIG. 4.

The dotted curve marked by circled crosses represents the trajectory actually displayed TP1 at time T1.

Figure 5:
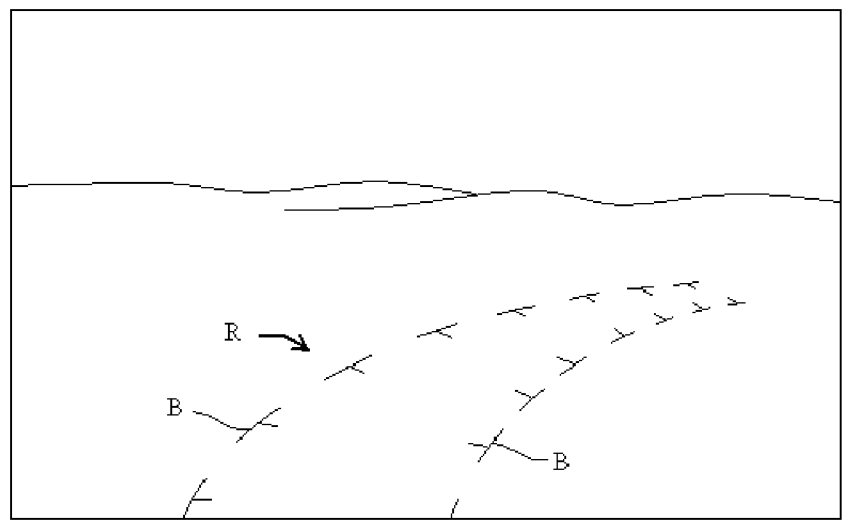
FIG. 5 shows a trajectory displayed by the method according to the invention on the screen of a display device.

In a fourth step, the trajectory is displayed conventionally on one of the instrument panel display screens. Generally, as illustrated in FIG. 5, the displayed trajectory TP takes the form of a path R of determined width, positioned laterally depending on the computed deviations and located above the resulting trajectory by a determined height, said path being limited by boundary markers B spaced a determined distance apart. In FIG. 5, this path R is shown in perspective.

Advantageously, the shape, colour or size of the boundary markers differs according to whether the trajectory is imposed or predicted in a lateral or vertical plane. By way of non-limiting examples, the boundary markers may be composed of two segments, as shown in FIGS. 6 to 9. The first segment SV is horizontal and represents the vertical component of the trajectory, the second segment SL is oblique and represents the lateral component of the trajectory. The first segment is connected to the second segment at its midpoint. When a segment represents a portion of imposed trajectory, it is shown as a solid line. When a segment represents a portion of predicted trajectory, it is shown as a dotted line.

Figure 6:
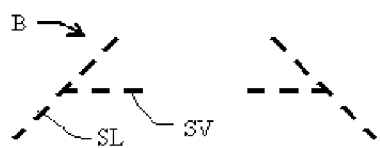
FIGS. 6 to 9 show exemplary representations of the limits of the displayed trajectory according to the type of trajectory computed.
Figure 7:
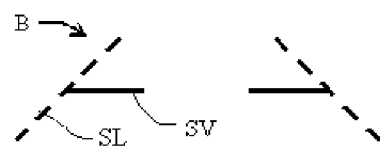
Figure 8:
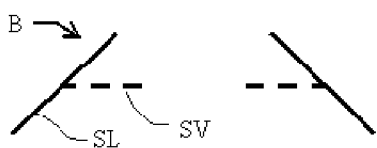
Figure 9:
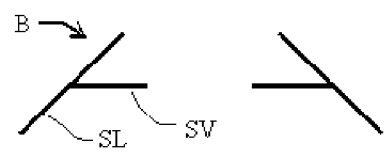

FIGS. 6 to 9 then illustrate the various ways in which the boundary markers of the path are shown using this symbolic representation. In FIG. 6, the path is a predicted trajectory, both in the lateral and vertical directions. In FIG. 7, the path is a predicted trajectory in the horizontal direction and an imposed trajectory in the vertical direction. In FIG. 8, the path is a predicted trajectory in the vertical direction and an imposed trajectory in the horizontal direction. Lastly, in FIG. 9, the path is an imposed trajectory in both the vertical and horizontal directions.

The invention claimed is:

1. A method for a three-dimensional synthetic representation of a trajectory of an aircraft in flight, said method being implemented in a flight and navigation system of an aircraft, said flight and navigation system comprising at least one navigation system, one cartographic database representing an overflown terrain, a three-dimensional image computer and a display system allowing computed synthetic images to be displayed, a flight plan of the aircraft comprising georeferenced trajectories, referred to as imposed trajectories, and non-georeferenced trajectories, referred to as predicted trajectories, wherein, when the trajectory of the aircraft is dependent on a non-georeferenced flight setpoint, said three-dimensional synthetic representation method is an iterative process, each iteration comprising at least the following steps:

computing a predicted trajectory at the current time arising from at least one trajectory computed at a time preceding the current time extending over a determined distance or duration;

computing a smoothed trajectory from the predicted trajectory in order to obtain a resulting trajectory; computing a displayed trajectory, said displayed trajectory being equal to the resulting trajectory corrected for deviations depending on the application of setpoints from a flight director; and displaying said displayed trajectory.

2. The method for the three-dimensional synthetic representation of the trajectory of an aircraft in flight according to claim 1, wherein the predicted trajectory is a function of three successive trajectories of the aircraft, referred to as computed trajectories, computed during at least three successive instants in time separated by a constant duration, each of the three trajectories starting at one of said three instants in time, each trajectory extending over a determined distance or duration.

3. The method for the three-dimensional synthetic representation of the trajectory of an aircraft in flight according to claim 2, wherein the predicted trajectory is a quadratic interpolation of the computed trajectories.

4. The method for the three-dimensional synthetic representation of the trajectory of an aircraft in flight according to claim 1, wherein, when the trajectory of the aircraft depends on a non-georeferenced flight setpoint at the current time and depends on a georeferenced flight setpoint at a future time, the duration separating the future time from the current time corresponding to a distance travelled by the aircraft that is less than or equal to a determined threshold, the resulting trajectory is dependent on the computed trajectories and on the conditions for engaging said georeferenced flight setpoint.

5. The method for the three-dimensional synthetic representation of the trajectory of an aircraft in flight according to claim 1, wherein, when there is a computed deviation between the resulting trajectory and the displayed trajectory, a deviation displayed at the current time is either a sum of the deviation displayed at the preceding time corrected for a function dependent on the tracking performance of the flight director, or the product of the deviation displayed at the preceding time with a determined coefficient, intended to decrease this deviation.

6. The method for the three-dimensional synthetic representation of the trajectory of an aircraft in flight according to claim 1, wherein the displayed trajectory takes the form of a path of determined width, positioned laterally depending on the computed deviations and above the resulting trajectory by a determined height, said path being limited by boundary markers spaced a determined distance apart.

7. The method for the three-dimensional synthetic representation of the trajectory of an aircraft in flight according to claim 6, wherein the shape, colour or size of the boundary markers differs according to whether the trajectory is imposed or predicted in a lateral plane.

8. The method for the three-dimensional synthetic representation of the trajectory of an aircraft in flight according to claim 6, wherein the shape, colour or size of the boundary markers differs according to whether the trajectory is imposed or predicted in a vertical plane.

* * * * *